US005547655A

United States Patent [19]

Chou et al.

[11] Patent Number: 5,547,655
[45] Date of Patent: Aug. 20, 1996

[54] RECOVERY AND REGENERATION OF SULFURIC ACID

[76] Inventors: Tse-Chaun Chou; Yi-Lin Chen, both of 22, Lane 252, Dong Ping Road, Tainan, Taiwan, 701

[21] Appl. No.: 348,151

[22] Filed: Nov. 28, 1994

[51] Int. Cl.$^6$ ..................................................... C01B 17/90
[52] U.S. Cl. ................ 423/531; 423/525; 423/526; 423/527; 423/DIG. 2; 204/157.15; 204/157.4; 204/158.2; 208/13
[58] Field of Search .................. 423/DIG. 2, 525, 423/526, 527, 531; 204/157.15, 157.4, 158.2; 208/13

[56] References Cited

U.S. PATENT DOCUMENTS

| 1,842,884 | 1/1932 | Taylor | 423/525 |
|---|---|---|---|
| 3,888,750 | 6/1975 | Brecher et al. | 204/129 |
| 4,085,016 | 4/1978 | Janjua et al. | 204/104 |
| 5,308,458 | 5/1994 | Urwin et al. | 204/157.6 |

FOREIGN PATENT DOCUMENTS

| 4216499 | 12/1993 | Germany | 423/531 |
|---|---|---|---|
| 1-94998 | 4/1989 | Japan | 204/158.2 |
| 567664 | 8/1977 | U.S.S.R. | 423/531 |

OTHER PUBLICATIONS

"Physical Chemistry" by Atkins, 1978 printed in Great Britain by Oxford University Press, pp. 354–356 (no month).

Primary Examiner—Gary P. Straub
Assistant Examiner—Timothy C. Vanoy
Attorney, Agent, or Firm—Bacon & Thomas

[57] ABSTRACT

Using generated active intermediates or species simultaneously to remove water and organic compounds from the spent sulfuric acid catalyst of the alkylation of olefins and alkanes is disclosed in this invention. Over 90% water and 95% organic compounds of the spent catalyst can be removed by this invention under mild operating conditions, less than 20 atms and in the temperature range from −50° to 250° C. This invention provides a novel process instead of the traditional or commercial process by combustion and treatment of the spent catalyst at high temperature. It is significant to simplify comparing with the traditional process, and is a safe, simple, clean or pollutionless, and cheap one-stage process.

10 Claims, No Drawings

RECOVERY AND REGENERATION OF SULFURIC ACID

TECHNICAL FIELD

This invention relates to a method for treatment of waste liquid and for recovery and regeneration of sulfuric acid by simultaneous removal of both water and organic compounds from the spent sulfuric acid catalyst of alkylation of olefins and alkanes.

The organic compounds or impurities to be removed from the spent sulfur acid catalyst via the present invention are numerous and varied. These organic impurities are typically associated with the alkylation of olefins and alkanes, and are well known to one of ordinary skill in the art. Due to the large number of organic impurities in spent sulfuric acid from such alkylation processes, it is very difficult to identify with specificity all of the different organic impurities. Moreover, one of ordinary skill in the art understands that the types of organic impurities depend upon the operating conditions of the alkylation process.

BACKGROUND OF THE INVENTION

In a commercial alkylation plant, acid is used as catalyst to produce gasoline by the alkylation of $C_3$–$C_5$ olefins and alkanes. The catalytic acids include sulfuric acid, hydrogen fluoride, and solid acid. Only sulfuric acid and hydrogen fluoride are commercialized nowadays. Because hydrogen fluoride is very toxic, hydrogen fluoride is gradually being phased out in the alkylation process. The most popular catalyst used to manufacture gasoline from the alkylation of $C_3$–$C_5$ olefins and alkanes is concentrated sulfuric acid. The ratio of sulfuric acid to organic compounds in the alkylation reaction vessel is 0.1~0.3, so the amount of concentrated sulfuric acid required in the alkylation process is very large. In general, producing one ton gasoline makes 0.1 ton spent sulfuric acid. If ten thousands barrels of gasoline are produced per day, one hundred tons of spent sulfuric acid are produced. Such a large amount of spent sulfuric acid can not be cast away or stored, it must be treated in advance. Based on the above description, the key point of alkylation is the treatment or regeneration of the spent sulfuric acid.

A lot of products during alkylation processes using sulfuric acid as catalyst were raised by L. F. Albright and A. R. Goldsby, *"Industrial and Laboratory alkylations"* in ACS symposium series 55, p. 91, Washington, D.C., 1977, as shown in Table 1.

TABLE 1

| Composition of alkylates obtained over $H_2SO_4$ | |
|---|---|
| hydrocarbons | composition ratio |
| isopentane | — |
| n-pentane | — |
| $C_5$ | 8.9 |
| 2,3-dimethylbutane | 4.7 |
| 2-methylpentane | 1.1 |
| 3-methylpentane | 0.4 |
| $C_6$ | 6.2 |
| 2,2,3-trimethylbutane | 0.2 |
| 2,2-dimethylpentane | 0.2 |
| 2,4-dimethylpentane | total |
| 2-methylhexane | 3.4 |
| 3-methylhexane | 0.3 |
| 2,3-dimethylpentane | 2.3 |
| $C_7$ | 6.4 |

TABLE 1-continued

| Composition of alkylates obtained over $H_2SO_4$ | |
|---|---|
| hydrocarbons | composition ratio |
| 2,2,4-trimethylpentane | 24.3 |
| 2,2,3-trimethylpentane | 1.2 |
| 2,3,3-trimethylpentane | 12.3 |
| 2,3,4-trimethylpentane | 13.0 |
| 2,2-dimethylhexane | 0.2 |
| 2,3-dimethylhexane | total |
| 2,4-dimethylhexane | 3.0 |
| 2,5-dimethylhexane | 6.6 |
| 3,4-dimethylhexane | 0.4 |
| $C_8$ | 61.0 |
| $C_9$ and higher | 17.5 |

The organic products may reside in the sulfuric acid to form said organic impurities, and the water contained in the raw material of alkylation or generated during alkylation may accumulate in sulfuric acid, so the spent sulfuric acid must be regenerated to remove both the organic impurities and the water.

In order to treat the spent sulfuric acid in a commercial alkylation plant, a sulfuric acid plant is usually set up. The procedure of the treatment of sulfuric acid is described as following. First of all, spent sulfuric acid, air, and fuel are sent into the combustion chamber to burn out the organic impurities and sulfuric acid into $SO_2$, $SO_3$, $CO_2$, $H_2O$ and ashes, etc. After drying the gases from the combustion chamber, the dried gases are purified to remove impurities and ashes in order to get pure $SO_2$. The $SO_2$ gas reacts with air or oxygen to convert to $SO_3$ at high temperature using $V_2O_5$, etc. as catalyst. The $SO_3$ gas is absorbed twice by water to get concentrated sulfuric acid. The operation of producing sulfuric acid in commercial process is very difficult and the costs of both equipment and operation are very expensive, because the complexity of the process, the corrosion of equipment at high temperature, and the presence of different impurities in the spent catalyst.

From the above description, there are some disadvantages using the traditionally commercialized process to treat the spent sulfuric acid: (1) To recover the regenerated sulfuric acid, several stages including in this process; combustion, purification, oxidation, purification again, and absorption have to be carried out on the spent sulfuric acid. The whole process is very complicated. (2) The corrosive compound is treated at very high temperature, so special material has to be chosen to construct the reactor, etc. (3)Based on the descriptions of (1) and (2), the costs of both equipment and operation are very expensive obviously. (4) Very large amount of waste water, waste gas, and ashes are produced during the recovery process. Additional investment has to be funded to the facilities of retreatment for the waste materials. The additional investment is substantial. So, the traditionally commercialized process for the recovery of sulfuric acid from the spent catalyst of alkylation is very complicated and expensive.

SUMMARY OF THE INVENTION

This invention is an industrial chemical process and, in particular, the electrochemical process for recovery and regeneration of sulfuric acid from the spent sulfuric acid catalyst of the alkylation of $C_3$–$C_5$ olefins and alkanes by using active intermediates generated by electrolysis, heat and photolysis. Both the organic impurities and water containing in the spent sulfuric acid are simultaneously removed under mild operating conditions. Over 90% water and 95% organic impurities of its initial value, respectively, are efficiently removed from the spent sulfuric acid by using this invention. This invention provides a novel process to avoid the disadvantages of the combustion of the corrosive spent sulfuric acid at high temperature, the purification and oxidation of $SO_2$ at high temperature in the traditionally commercialized process.

DETAILED DESCRIPTION

In this invention, active intermediates can be produced under mild operating conditions, less than 20 atms and in the temperature range from $-50°$ to $250°$ C. The types of active intermediates generated in the process of this invention include:

1. The organic free radicals: alkyl free radical, radical cation, poxy free radical, radical anion, and oxyalkyl free radical are included in this invention.

2. The organic peroxide: alkyl hydroperoxide(HOOR), dialkyl peroxide (ROOR'), peroxy acids(RCOOOH), peroxy esters(RCOOOR'), diacyl peroxides (RCOOOOCR'), alkylidene peroxides, peroxide copolymers, peroxides derivated from phenols and organoperoxymetallic compounds are included in this invention.

3. The inorganic free radical, redox mediator or ions, and compounds: H., OH., $HO_2$., $HO_3$., HO.$^-$, $O_2^-$, $H_2O_2$, HClO, HBrO $SO_4^{2+}/S_2O_8^{2+}$, $Ag^{2+}/Ag^+$, $ClO^-/Cl^-$, $BrO^-/Br^-$, $IO_4^-/IO_3^-$, $V^{5+}/V^{4+}$, $Sn^{4+}/Sn^{2+}$ and $Fe^{3+}/Fe^{2+}$ redox mediators are included in this invention.

The active intermediates can be produced by photolysis, heating, or electrolysis. When photolysis is applied, the range of wavelength is from 10 to 700 nm, the intensity of light source is over 10W. This kind of light source can provide the organic compounds and peroxide compounds with suitable energy to form active intermediates whether or not the semiconductor, such as $TiO_2$, is used as photocatalyst. Similar phenomena happen when heat is applied. In the case of electrolysis, C, Au, Pt, Ag, Fe, Ti, $RuO_2$, $TiO_2$, $PbO_2$, Pb, Ni, NiO(OH), etc., or any material described above plating on other substrate can be chosen as electrode. When charge is introduced, the active intermediates are produced.

All of the active intermediates mentioned above, in general, can make chain reaction and repeat reactions cyclically and remove both the organic impurities and water in the spent sulfuric acid.

Sometimes, one or more than one compound is introduced into the reaction system in order to generate the active intermediates as mentioned above, however, in certain case, no other compound is needed. It depends on the condition of the spent sulfuric acid. If it is necessary to introduce another compound to generate active intermediates, the compound can be hydrogen peroxide, organic peroxide, oxygen, hydrogen hypochloride, hydrogen hypobromide, $Ag^+$, salt of iodate, $V^{5+}$ cation, $Sn^{4+}$ cation, perchloric acid, salt of perchlorate. All the materials described above can be used as the raw material to produce the active intermediates and they are included in this invention.

The decomposition of such raw material can be described as the following two examples:

(example 1)

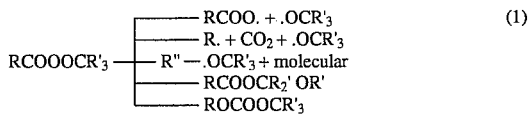

(example 2)

$$H_2O_2 \rightarrow H_2O + O \quad (2)$$

$$H_2O_2 \rightarrow 2\ OH. \quad (3)$$

$$H_2O_2 \rightarrow H. + HO_2. \quad (4)$$

The active intermediates can react with the organic impurities in the spent sulfuric acid to degrade the organic compounds and produce carbon dioxide. Consequently, the COD of the spent sulfuric acid decreases.

Because the composition and concentration of homogeneous catalyst are the standard to judge the activity of the homogeneous catalyst, the activity of spent sulfuric acid treated by this invention is similar to the fresh catalyst by comparing the experimental results with the data raised by L. F. Albright et al, "Alkylation of Isobutane with Olefins. Yields of Alkylates for Different Olefins" *I&EC*, 32(1993), pp.2991–2996. And D. J. AmEnde et al, "Effect of Sulfuric Acid Composition on the Kinetics and Mechanism of Sulfuric Acid-Catalyzed Alkylations of Isobutane with Alkanes" in *Symposium on Alkylation, Aromatization, Oligomerization and Isomerization of Short Chain Hydrocarbons over Heterogeneous Catalysts*, New York, Aug. 25–30(1991).

This invention has the advantages comparing with the traditionally commercialized process: (1) The complicated treatment of the traditionally commercialized process is not needed anymore. Simultaneous removal of both organic impurities and water is accomplished in one step. The process is simplified to a great extent. (2) The required temperature is not very high in this process. So, the influence resulting from the corrosive material reduces to a certain extent. Consequently, the cost of the material of the reactor is reduced. (3) The wastewater, waste gas, and ashes produced by the traditionally commercialized process can be greatly reduced. Most of the investment on the environmental protection is saved. (4) From the descriptions of (1), (2), and (3), this invention greatly reduces the cost of equipment, operation, and maintenance.

This invention can be widely applied to the treatment of any waste liquid containing organic compounds. Raw material of active species can be introduced into the reaction system no matter in solid, liquid, or gas phase style. All of these styles have good efficiency.

EXAMPLE 1

A 100 ml spent sulfuric acid was introduced into the semibatch reactor. The specific gravity of the spent sulfuric acid was 1.84, and its color was dark-black. The spent sulfuric acid was heated and air was introduced into the solution. Until the temperature steadily remained at $70°$ C., hydrogen peroxide was added into the solution slowly. Then hydrogen peroxide decomposed to active intermediates. The active intermediates can react with the organic compounds in the spent sulfuric acid and decompose the organic compounds. At the temperature, $70°$ C., water will evaporate gradually. Adjusting the heating time and temperature can control the percentage of water. After the reaction, organic compounds and water can be removed simultaneously. Finally, the COD and water content of the spent sulfuric acid were reduced from 110000 to 4200 and from 9% to 1.5%, respectively. The color of spent catalyst changed from dark-black to light-yellow.

EXAMPLE 2

A 100 ml spent sulfuric acid was introduced into the semibatch reactor. The spent sulfuric acid was heated and air was introduced into the solution. Until the temperature steadily remained at 80° C., peroxyacetic acid was added into the solution slowly. Peroxyacetic acid can decompose to active intermediates and the active intermediates can react with the organic compounds in spent sulfuric acid and decompose the organic compounds. After the similar treatment as describing in example 1, finally, the COD and water content of the spent sulfuric acid were reduced from 110000 to 4300 and from 9% to 1%, respectively. The color of spent catalyst changed from dark-black to light-yellow.

EXAMPLE 3

The spent sulfuric acid was introduced into the flow system at the flow rate of 40 ml/hr. The temperature of the reaction system was set at 80° C., and air was introduced at suitable positions into the reactor. When the operating temperature was at steady state, peroxyacetic acid was introduced into the reactor in order to produce active intermediates. The active intermediates reacted with the organic compounds in the spent sulfuric acid. The outlet spent sulfuric acid was introduced into a purge vessel which was heated to 150° C. to evaporate water. Finally, light-yellow, nearly colorless liquid could be obtained at the outlet of the vessel. The COD and water content of the spent sulfuric acid were reduced from 110000 to 4250 and from 9% to 0.5%, respectively.

EXAMPLE 4

A 100 ml spent sulfuric acid was introduced into the semibatch reactor. Perpropionic acid was added into the solution slowly. Photo energy was applied to the reaction system by applying the the light of wavelength 2537A. Then, the active intermediates was produced and reacted with the organic compounds in the spent sulfuric acid. The efficiency of photolysis was not as good as the method of heating. If some semiconductor plate, such as $TiO_2$, is introduced into the solution as photo-catalyst, the efficiency can certainly increase. Besides, no additional energy is needed anymore.

EXAMPLE 5

A 40 ml spent sulfuric acid was introduced into the batch reactor. Platinum or graphite was chosen as the electrode. The spent sulfuric acid was heated and air was introduced into the solution. Until the temperature steadily remained at 70° C., electric energy was applied to the reaction system at 7.0 volt. By applying the charge amount of 147000C the active intermediates was produced and reacted with the organic compounds in the acid. After the similar treatment as describing in example 1, finally, the COD and water content of the spent sulfuric acid were reduced from 110000 to 4100 and from 9% to 1%, respectively. The color of spent catalyst changed from dark-black to light-yellow.

What is claimed is:

1. A method of recovery and regeneration of spent sulfuric acid catalyst from alkylation of olefins and alkanes, said spent sulfuric acid catalyst containing organic impurities and water, comprising the steps of:

(a) introducing spent sulfuric acid catalyst containing organic impurities and water into an electrolysis reactor containing and anode and cathode, introducing air into said spent sulfuric acid at a temperature of between −50 and 250 degrees C. and less than 20 atm;

(b) supplying electricity to said cathode and anode;

(c) creating as active intermediates OH., $HO_2$., $HO_3$., $H_2O_2$, $SO_4^{2-}/S_4O_8^{2-}$, hydroperoxide, dialkyl peroxide, peroxy acid or organic free radical generated via the electrolysis of said organic impurities;

(d) decomposing said organic impurites via reaction with said active intermediates;

(e) decomposing water via electrolysis and reaction with said active intermediates in said spent sulfuric acid; and, (f) vaporizing water in said spent sulfuric acid to regenerate sulfuric acid catalyst for the alkylation of olefins and alkanes.

2. The method of claim 1, also comprising the steps of adding an organic peroxide into said spent sulfuric acid in said reactor and applying photo energy at a wavelength of 10–700 nm and having an energy higher than that for decomposing said added peroxide in the presence of added organic peroxides or $H_2O_2$ to produce active intermediates OH., $HO_2$., $HO_3$., $H_2O_2$, $SO_4^{2-}/S_4O_8^{2-}$, hydroperoxide, dialkyl peroxide, peroxy acid or organic free radical generated via the photolysis of organic impurities; said organic impurities decomposing via reaction with said active intermediates; and decomposing water in said spent sulfuric acid via reaction with said active intermediates in said spent sulfuric acid.

3. The method of claim 2, also comprising the step of adding a semiconductor photocatalyst to said spent sulfuric acid in said reactor.

4. The method of claim 1, also comprising the steps of applying photo energy at a wavelength of 10–700 nm to produce active intermediates OH., $HO_2$., $HO_3$., $H_2O_2$, $SO_4^{2-}/S_4O_8^{2-}$, hydroperoxide, dialkyl peroxide, peroxy acid or organic free radical generated via the photolysis of organic impurities; said organic impurities decomposing via reaction with said active intermediates; and decomposing water in said spent sulfuric acid via reaction with said active intermediates in said spent sulfuric acid.

5. The method of claim 1, also comprising the steps of adding an organic peroxide into said spent sulfuric acid; heating and maintaining a steady temperature of said spent sulfuric acid in said reactor; creating active intermediates OH., $HO_2$., $HO_3$., $H_2O_2$, $SO_4^{2-}/S_4O_8^{2-}$, hydroperoxide, dialkyl peroxide, peroxy acid and organic free radical generated via the heating of organic impurities in the presence of added organic peroxides or $H_2O_2$; said organic impurities decomposing via reaction with said active intermediates; decomposing water in said spent sulfuric acid via reaction with said active intermediates in said spent sulfuric acid.

6. The method of claim 2, wherein the organic peroxide is peroxyacetic acid.

7. The method of claim 3, wherein the organic peroxide is perpropionic acid and the semiconductor photocatalyst is $TiO_2$.

8. The method of claim 5 wherein the temperature maintained is between 70 and 80 degrees centigrade.

9. The method of claim 1, wherein the spent sulfuric acid has a COD of 11000 and the regenerated sulfuric acid has a COD of 4300.

10. The method of claim 9, wherein the regenerated sulfuric acid has a water content of between 1 and 1.5%.

* * * * *